(12) United States Patent
Akita

(10) Patent No.: US 8,786,683 B2
(45) Date of Patent: Jul. 22, 2014

(54) STEREOSCOPIC DISPLAY UNIT

(75) Inventor: Masayoshi Akita, Tokyo (JP)

(73) Assignee: Sony Corporation, Tokyo (JP)

( * ) Notice: Subject to any disclaimer, the term of this patent is extended or adjusted under 35 U.S.C. 154(b) by 569 days.

(21) Appl. No.: 12/945,977

(22) Filed: Nov. 15, 2010

(65) Prior Publication Data

US 2011/0122128 A1 May 26, 2011

(30) Foreign Application Priority Data

Nov. 20, 2009 (JP) ................................ 2009-264985

(51) Int. Cl.
*G06T 15/00* (2011.01)
*H04N 13/04* (2006.01)
*G02B 27/26* (2006.01)
*G02B 27/22* (2006.01)

(52) U.S. Cl.
CPC ....... *H04N 13/0452* (2013.01); *H04N 13/0434* (2013.01); *H04N 13/0404* (2013.01); *G02B 27/26* (2013.01); *G02B 27/2214* (2013.01)
USPC ........................................... 348/51; 345/419

(58) Field of Classification Search
USPC ............................................ 345/419; 348/51
See application file for complete search history.

(56) References Cited

U.S. PATENT DOCUMENTS

| | | | |
|---|---|---|---|
| 5,061,935 A * | 10/1991 | Sekine et al. ............... | 342/180 |
| 5,315,377 A * | 5/1994 | Isono et al. ................ | 348/51 |
| 5,982,538 A * | 11/1999 | Shikama et al. ........... | 359/465 |
| 6,055,013 A * | 4/2000 | Woodgate et al. .......... | 348/59 |
| 6,929,369 B2 * | 8/2005 | Jones .......................... | 353/10 |
| 7,864,422 B2 * | 1/2011 | Jung ............................ | 359/463 |
| 7,974,007 B2 * | 7/2011 | Jung ............................ | 359/463 |
| 8,388,138 B1 * | 3/2013 | Boothroyd ................. | 353/7 |
| 2005/0286126 A1 * | 12/2005 | Huang et al. .............. | 359/465 |
| 2006/0114415 A1 * | 6/2006 | Shestak et al. ............ | 353/7 |
| 2006/0176557 A1 * | 8/2006 | Travis et al. ............... | 359/462 |
| 2006/0290888 A1 * | 12/2006 | Jung et al. .................. | 353/8 |
| 2007/0165305 A1 * | 7/2007 | Mehrle ....................... | 359/464 |
| 2008/0055400 A1 * | 3/2008 | Schechterman et al. ... | 348/51 |
| 2008/0158343 A1 * | 7/2008 | Schechterman et al. ... | 348/45 |
| 2009/0033812 A1 * | 2/2009 | Ijzerman et al. ........... | 349/15 |
| 2009/0219985 A1 * | 9/2009 | Swaminathan et al. ... | 375/240.01 |
| 2009/0262125 A1 * | 10/2009 | Swaminathan et al. ... | 345/581 |

(Continued)

FOREIGN PATENT DOCUMENTS

| | | |
|---|---|---|
| JP | 2000-102038 A | 4/2000 |
| JP | 2005-517991 | 6/2005 |
| JP | 3767962 | 2/2006 |

*Primary Examiner* — Christopher S Kelley
*Assistant Examiner* — Asmamaw G Tarko
(74) *Attorney, Agent, or Firm* — Wolf, Greenfield & Sacks, P.C.

(57) ABSTRACT

Embodiments of the invention provide an image display device that is switchable between a two-dimensional display mode, a three-dimensional display mode enabling non-autostereoscopic image display, and a three-dimensional display mode enabling autostereoscopic image display. In one embodiment, the image display device comprises a display panel operable to transmit light corresponding to image data; a polarization state conversion section comprising a first polarization segment for converting light transmitted by the display device to a first polarization state, and a second polarization segment for converting light transmitted by the display device to a second polarization state; and an optical separation element that is placed, via application of a voltage, in an on state in which light transmitted by the display panel is refracted or an off state in which light transmitted by the display panel is not refracted.

32 Claims, 11 Drawing Sheets

(56) References Cited

U.S. PATENT DOCUMENTS

| | | | |
|---|---|---|---|
| 2010/0097446 A1* | 4/2010 | Miyazaki et al. | 348/51 |
| 2010/0253677 A1* | 10/2010 | Kroll et al. | 345/419 |
| 2011/0080462 A1* | 4/2011 | Yamaji et al. | 348/42 |
| 2011/0248911 A1* | 10/2011 | Si | 345/156 |
| 2011/0285927 A1* | 11/2011 | Schultz et al. | 349/15 |
| 2012/0019734 A1* | 1/2012 | Lee | 349/15 |
| 2012/0062711 A1* | 3/2012 | Ikeda et al. | 348/51 |
| 2012/0099205 A1* | 4/2012 | Bae et al. | 359/620 |
| 2012/0169714 A1* | 7/2012 | Hsu et al. | 345/419 |
| 2012/0250151 A1* | 10/2012 | Lee et al. | 359/463 |
| 2012/0268451 A1* | 10/2012 | Tsai et al. | 345/419 |
| 2012/0287127 A1* | 11/2012 | Ikeda et al. | 345/419 |
| 2012/0293614 A1* | 11/2012 | Ikeda et al. | 348/42 |
| 2012/0300042 A1* | 11/2012 | Yun et al. | 348/51 |
| 2013/0335649 A1* | 12/2013 | Mather et al. | 349/15 |

* cited by examiner

STEREOSCOPIC DISPLAY UNIT

BACKGROUND OF THE INVENTION

1. Field of the Invention

The present invention relates to a stereoscopic display unit for performing three-dimensional display by using binocular parallax.

2. Description of the Related Art

In the past, stereoscopic display units that realize stereoscopic vision by providing different images (parallax images) as a viewer left-eye image and a viewer right-eye image between which parallax exists. Examples of methods of such stereoscopic display units include eyeglass method and naked eye method. The eyeglass method realizes stereoscopic vision by wearing special eyeglasses for stereoscopic vision. In Japanese Patent No. 3767962, as eyeglasses for stereoscopic vision, a method using a polarization filter is disclosed.

Meanwhile, in the naked eye method, stereoscopic vision is enabled with naked eyes without wearing the special eyeglasses. Examples of naked eye methods include parallax barrier method and lenticular method. In the parallax barrier method, a structure called a parallax barrier as a parallax separation means is arranged oppositely to a two-dimensional display panel. Right and left parallax images displayed on the two-dimensional display panel are parallax-separated in the horizontal direction by the parallax barrier, and therefore stereoscopic vision is realized. In the lenticular method, a lenticular lens as a parallax separation means is arranged oppositely to a two-dimensional display panel. Right and left parallax images displayed on the two-dimensional display panel are parallax-separated in the horizontal direction by the lenticular lens, and therefore stereoscopic vision is realized. Further, a display unit in which display is changeable between two-dimensional display and three-dimensional display by the lenticular method by using a variable lenticular lens composed of a liquid crystal lens or a liquid lens has been known (refer to Japanese Unexamined Patent Application Publication No. 2000-102038 and Japanese Unexamined Patent Application Publication No. 2005-517991).

SUMMARY OF THE INVENTION

However, in the case of the parallax barrier method and the lenticular method, a stereoscopic range (visual region) is small. Thus, there is a disadvantage that viewing position and viewing distance are limited and many viewers are not able to view images at the same time. Meanwhile, in the case of the eyeglass method, limitation of viewing position and viewing distance is small, and many viewers are able to view images at the same time. However, there is a disadvantage that dedicated eyeglasses are necessitated. Thus, it is convenient if three-dimensional display method is switchable according to the number of viewers and audio-visual environment in one stereoscopic display unit.

In view of the foregoing disadvantages, in the invention, it is desirable to provide a stereoscopic display unit with which display is switchable between two-dimensional display and three-dimensional display, and three-dimensional display methods are switchable between the naked eye method and the eyeglass method.

One embodiment of the invention provides a stereoscopic display device, comprising: a display panel operable to transmit light corresponding to image data; a polarization state conversion section comprising a first polarization segment for converting light transmitted by the display device to a first polarization state, and a second polarization segment for converting light transmitted by the display device to a second polarization state; and an optical separation element that is placed, via application of a voltage, in an on state in which light transmitted by the display panel is refracted or an off state in which light transmitted by the display panel is not refracted.

In some embodiments, the optical separation element may, for example, comprise a variable lens array, such as a variable lens array comprising a liquid lenticular lens. In some embodiments, the optical separation element may comprise a liquid crystal lens, and application of a voltage may place the liquid crystal lens in an on state by changing an alignment direction of liquid crystal molecules in the liquid crystal lens.

Another embodiment of the invention provides an image display device comprising: a display that displays images in 2D and 3D, switchable between: a 2D display mode; a first 3D display mode enabling non-autostereoscopic image display; and a second 3D display mode enabling autostereoscopic image display.

In some embodiments, the display may be switchable between the first 3D display mode and the second 3D display mode by applying a voltage to an optical separation element.

According to embodiments of the invention, a stereoscopic display unit is provided in which a polarization state conversion section (the polarization section), variable lens array device, and polarized eyeglasses are appropriately combined, and the lens effect of the variable lens array device is variably switched between on-state and off-state according to the content of the image displayed on the two-dimensional display section. Thus, display is switchable between two-dimensional display and three-dimensional display, and three-dimensional display method is switchable between naked eye method and eyeglass method. Therefore, three-dimensional display suitable for audiovisual environment is enabled. For example, when the number of viewers is one or a small number such as two or more, three-dimensional display by naked eye method is able to be adopted. In this case, dedicated eyeglasses for three-dimensional display are not necessitated. Further, by performing three-dimensional display by eyeglass method, display images are able to be viewed by many people, and a viewer is able to view display images by freely selecting the viewing position.

Other and further objects, features and advantages of the invention will appear more fully from the following description.

BRIEF DESCRIPTION OF THE DRAWINGS

FIG. 2A illustrates a structure in a state that lens effect of the variable lens array device is off as a whole, and FIG. 2B illustrates a structure in a state that lens effect of the variable lens array device is on as a whole.

FIG. 3A illustrates a state that lens effect is generated, and FIG. 3B illustrates a state that lens effect is not generated.

FIG. 8A illustrates a state that lens effect does not exist (lens effect is off), and FIG. 8B illustrates a state that lens effect is generated (lens effect is on).

DETAILED DESCRIPTION OF THE PREFERRED EMBODIMENTS

Embodiments of the invention will be described in detail with reference to the drawings.

First Embodiment

Basic Structure of a Stereoscopic Display Unit

Figure 1:
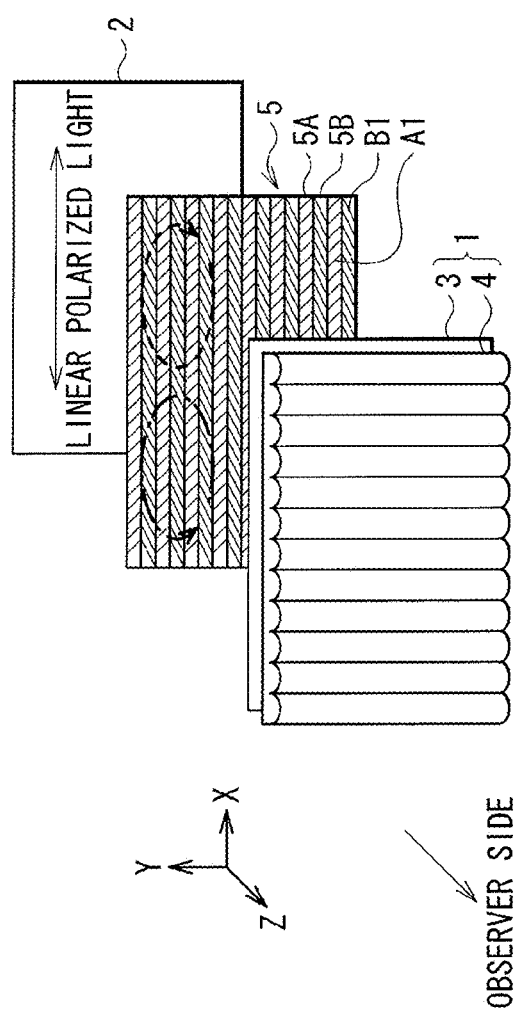
FIG. 1 is a structural view illustrating a whole structure of a stereoscopic display unit according to a first embodiment of the invention.
Figure 4:
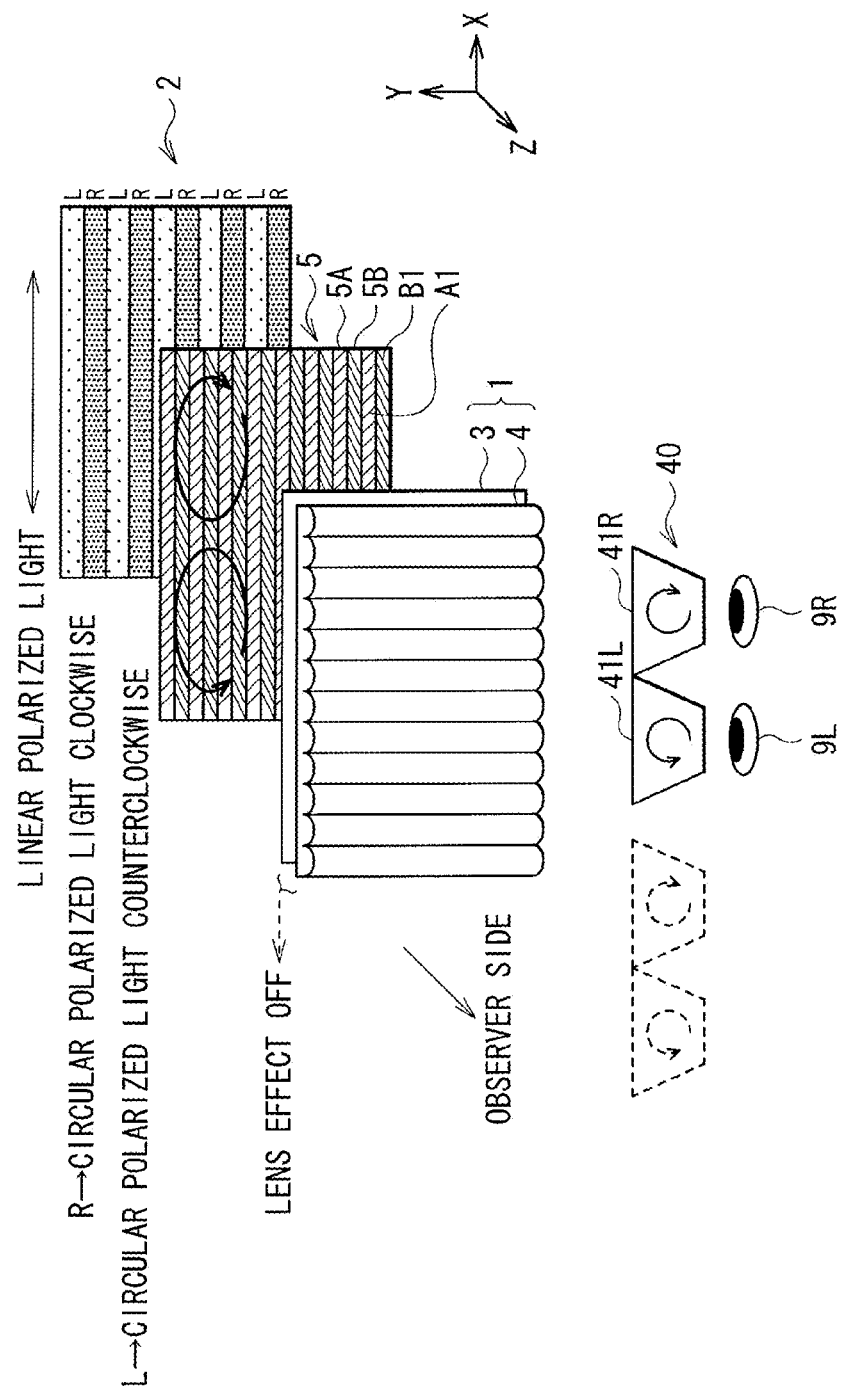
FIG. 4 is a structural view in the case where three-dimensional display is performed by eyeglass method in the stereoscopic display unit illustrated in FIG. 1.
Figure 5:
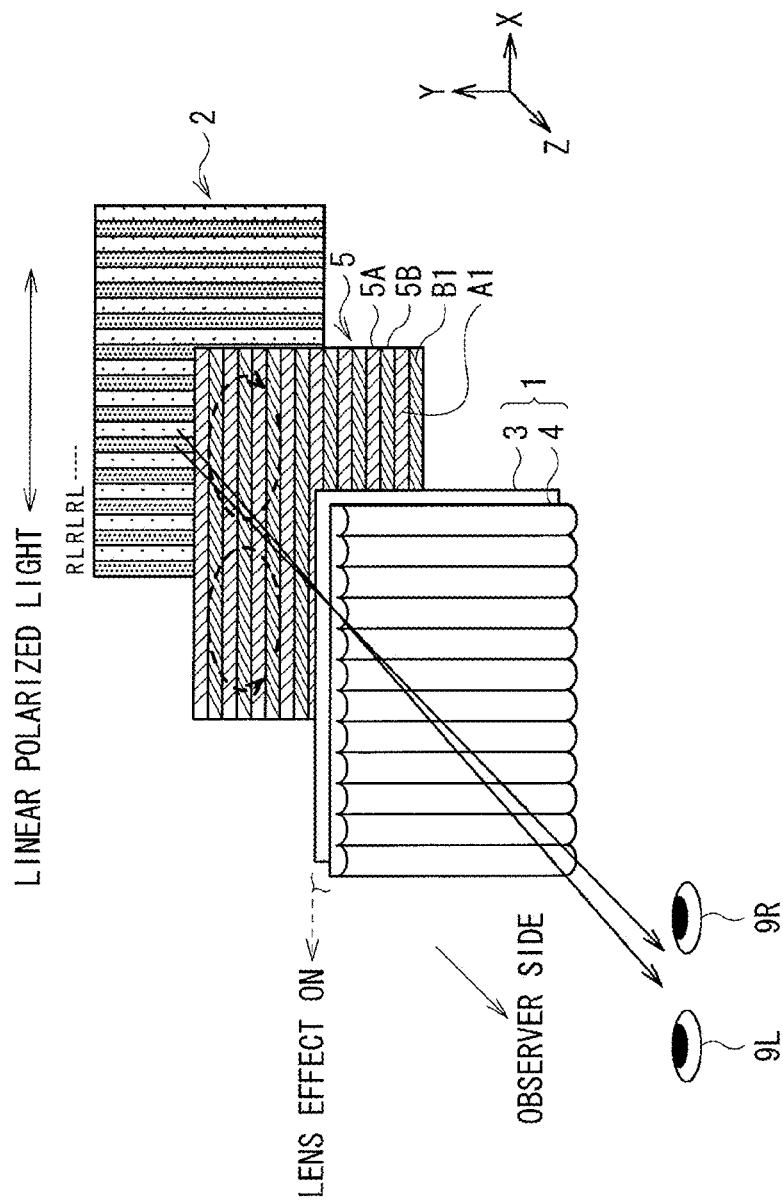
FIG. 5 is a structural view in the case where three-dimensional display is performed by naked eye method in the stereoscopic display unit illustrated in FIG. 1.

FIG. 1 illustrates a whole structure of a stereoscopic display unit according to a first embodiment of the invention. In the stereoscopic display unit, display mode is switchable between two-dimensional display mode and three-dimensional display mode, and three-dimensional display mode is switchable between naked eye method and eyeglass method. FIG. 4 schematically illustrates a state that three-dimensional display is performed by eyeglass method in the stereoscopic display unit. FIG. 5 schematically illustrates a state that three-dimensional display is performed by naked eye method. The stereoscopic display unit includes a display panel 2 as a two-dimensional display section, a polarization state conversion section 5 arranged oppositely to the display surface side of the display panel 2, and a variable lens array device 1. Further, as illustrated in FIG. 4, the stereoscopic display unit includes a polarized eyeglasses 40 used in viewing three-dimensional display by eyeglass method.

In the display panel 2, a plurality of pixels are arranged in a state of matrix. The display panel 2 is intended to perform two-dimensional image display. The display panel 2 is structured so that light originated in a displayed image is output in a state of linear polarized light that is polarized in a specific direction. FIG. 1 and the like illustrate an example that the displayed image light is output in a state of being linearly polarized in the horizontal direction (X-axis direction of FIG. 1) from the display panel 2. The display panel 2 is composed of, for example, a transmissive liquid crystal display. In the case of the liquid crystal display, a liquid crystal panel main body is sandwiched between two polarization plates so that each polarization direction is in a state of, for example, crossed nicols. The displayed image light is polarized in a direction determined by polarization direction of the polarization plate on the output side. The display structure itself may not output linear polarized light. A display having other structure may be used if a polarization plate is arranged oppositely to the display surface. For example, as the display panel 2, an organic EL (Electro-Luminescence) display, a plasma display panel or the like may be used in combination with a polarization plate.

The display panel 2 is intended to perform two-dimensional image display and three-dimensional image display. In two-dimensional image display, two-dimensional matrix display is performed based on general two-dimensional image data. In three-dimensional display, display is performed based on three-dimensional image data. The three-dimensional image data is data including a plurality of parallax images corresponding to a plurality of view angle directions in three-dimensional image display. In this embodiment, as the three-dimensional image data, parallax image data including a left-eye image L and a right-eye image R between which parallax exists is used. When three-dimensional image display is performed, in the display panel 2, the left-eye image L and the right-eye image R between which parallax exists are spatially separated, synthesized in one screen, and displayed. When three-dimensional image display by naked eye method is performed, as illustrated in FIG. 5, in the display panel 2, image display is performed so that a left-eye pixel segment that configures the left-eye image and a right-eye pixel that configures the right-eye image are alternately arranged along the horizontal direction. In the case where three-dimensional display by eyeglass method is performed, as illustrated in FIG. 4, image display is performed so that the left-eye image L and the right-eye image R are alternately arranged along the vertical direction.

The polarization state conversion section 5 converts light originated in an image displayed on the display panel 2 is converted to light in a first polarization state and light in a second polarization state with each polarization state different from each other for every given image region. The polarization state conversion section 5 alternately converts polarization state in the vertical direction for every region corresponding to the left-eye image L and the right-eye image R when three-dimensional display by eyeglass method is performed.

The polarization state conversion section 5 has a first phase difference plate 5A as a first polarization segment and a second phase difference plate 5B as a second polarization segment. The first phase difference plate 5A and the second phase difference plate 5B are strip-shaped phase difference plates extended in the horizontal direction. A plurality of first phase difference plates 5A and a plurality of second phase difference plates 5B are alternately arranged in the vertical direction. The first phase difference plate 5A is provided in a position corresponding to a display region of the left-eye image L displayed when three-dimensional display by eyeglass method is performed on the display panel 2. The second phase difference plate 5B is provided in a position corresponding to a display region of the right-eye image R displayed when three-dimensional display by eyeglass method is performed on the display panel 2.

The first phase difference plate 5A converts the linear polarized light output from the display panel 2 to a first circular polarized light, and outputs the first circular polarized light in the first polarization state. The second phase difference plate 5B converts the linear polarized light to a second circular polarized light with its rotation direction different from that of the first circular polarized light, and outputs the second circular polarized light in the second polarization state. More specifically, the first phase difference plate 5A and the second phase difference plate 5B are composed of a ¼ wave plate. A slow axis A1 of the first phase difference plate 5A and a slow axis B1 of the second phase difference plate 5B are tilted 45 deg in a direction different from each other in relation to the direction (X-axis direction) of the linear polarized light output from the display panel 2. For example, the slow axis A1 of the first phase difference plate 5A is tilted 45 deg upper leftward, and the slow axis B1 of the second phase difference plate 5B is tilted 45 deg upper rightward. Therefore, in the first phase difference plate 5A, the linear polarized light output from the display panel 2 is converted to circular polarized light counterclockwise, while in the second phase difference plate 5B, the linear polarized light output from the display panel 2 is converted to circular polarized light clockwise. The first phase difference plate 5A and the second phase difference plate 5B are provided in the region corresponding to the left-eye image L and the right-eye image R that are displayed when three-dimensional display by eyeglass method is performed. In the result, the left-eye image L is converted to circular polarized light counterclockwise, and the right-eye image R is converted to circular polarized light clockwise.

The polarized eyeglasses 40 have a first polarization filter 41L for a left-eye 9L and a second polarization filter 41R for a right-eye 9R. The first polarization filter 41L transmits only light in the first polarization state converted by the first phase difference plate 5A of the polarization state conversion section 5. The second polarization filter 41R transmits only light in the second polarization state converted by the second phase difference plate 5B.

Whole Structure of the Variable Lens Array Device 1

Figure 2:
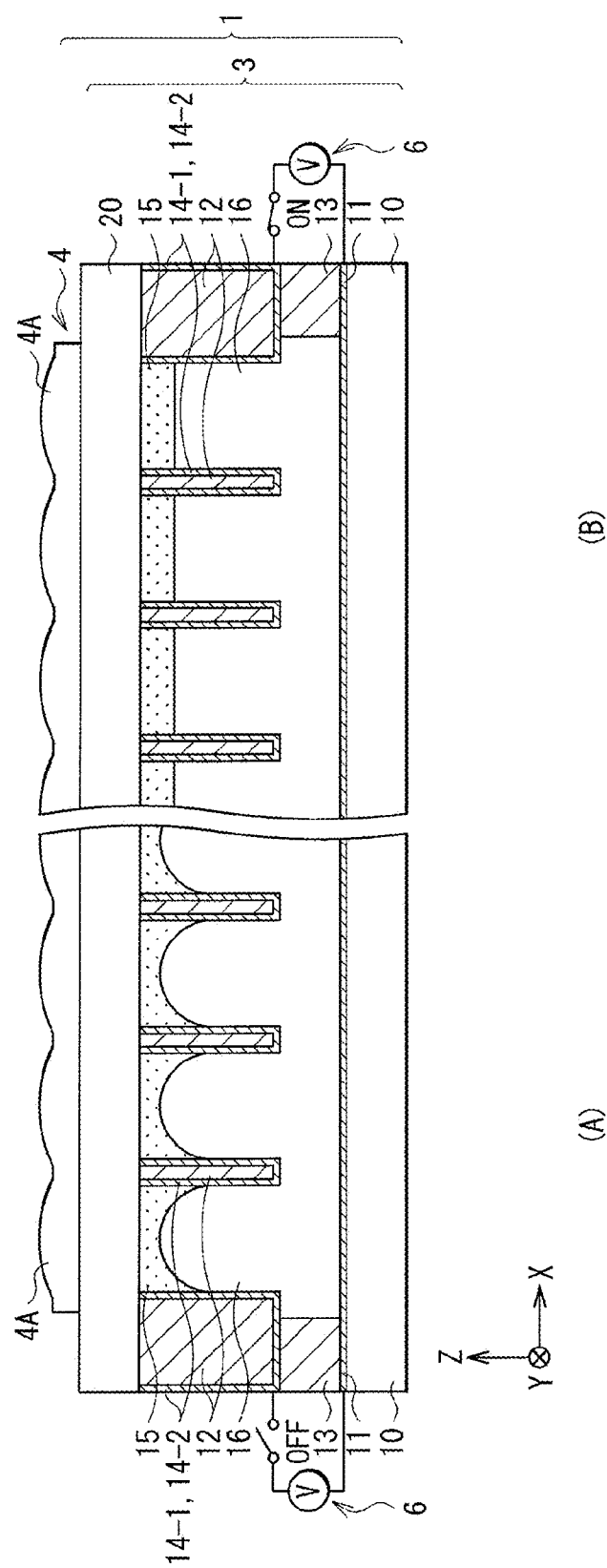
FIGS. 2A and 2B are cross sectional views illustrating a structure of a variable lens array device.

FIGS. 2A and 2B illustrate a structure of the variable lens array device 1. The variable lens array device 1 is intended to selectively change passing state of light ray from the display panel 2 by electrically on/off controlling lens effect according to the display mode. FIG. 2A illustrates a structure in a state that lens effect of the variable lens array device 1 is off as a whole, and FIG. 2B illustrates a structure in a state that lens effect of the variable lens array device 1 is on as a whole. The variable lens array device 1 includes a liquid lenticular lens 3 and a fixed lenticular lens 4 sequentially from the side opposed to the display panel 2. The liquid lenticular lens 3 has a plurality of variable lenses capable of electrically on/off controlling lens effect.

The fixed lenticular lens 4 has a plurality of fixed lenses provided correspondingly to the plurality of variable lenses. The plurality of fixed lenses respectively have refracting power to set off lens effect when the lens effect of respective corresponding variable lenses becomes in on-state. More specifically, the fixed lenticular lens 4 has a cylindrical lens array structure in which a plurality of cylindrical lenses 4A as a fixed lens are arranged in parallel with each other. In the fixed lenticular lens 4, the respective cylindrical lenses 4A are arranged to be extended in the longitudinal direction in relation to the display surface of the display panel 2, and to have positive refractive power in the right and left direction. The lens pitch in the lateral direction of the respective cylindrical lenses 4A corresponds to the size of the pixel width (for example, two pixels) of one pair of the left-eye image L and the right-eye image R to be displayed on the display panel 2.

Structure of the Liquid Lenticular Lens 3

The liquid lenticular lens 3 includes a first substrate 10 and a second substrate 20 that are oppositely arranged with a gap in between and a liquid layer arranged between the first substrate 10 and the second substrate 20. The liquid layer is composed of a silicone oil (insulating oil) 15 and an electrolytic solution 16. The first substrate 10 and the second substrate 20 are a transparent substrate made of, for example, a glass material or a resin material. In a peripheral section between the first substrate 10 and the second substrate 20, a dividing wall 12 and a dividing wall 13 are formed. The dividing wall 12 is also formed in a position corresponding to the lens pitch of the cylindrical lens 4A between the first substrate 10 and the second substrate 20. For the dividing wall 12 in the position corresponding to the lens pitch, the length in the vertical direction is shorter than that of a gap between the first substrate 10 and the second substrate 20, and a given gap exists between the dividing wall 12 in the position corresponding to the lens pitch and the first substrate 10. A liquid layer between adjacent two dividing walls 12 forms one variable lens. Such one variable lens corresponds to one cylindrical lens 4A of the fixed lenticular lens 4. On the surface on the side contacted with the liquid layer of the first substrate 10, a hydrophilic conducting film 11 is uniformly formed on almost whole area. On the surface of the dividing wall 12, a conducting film 14-1 and an insulating water-shedding film 14-2 are formed sequentially from the dividing wall 12 side as described later.

Figure 3:
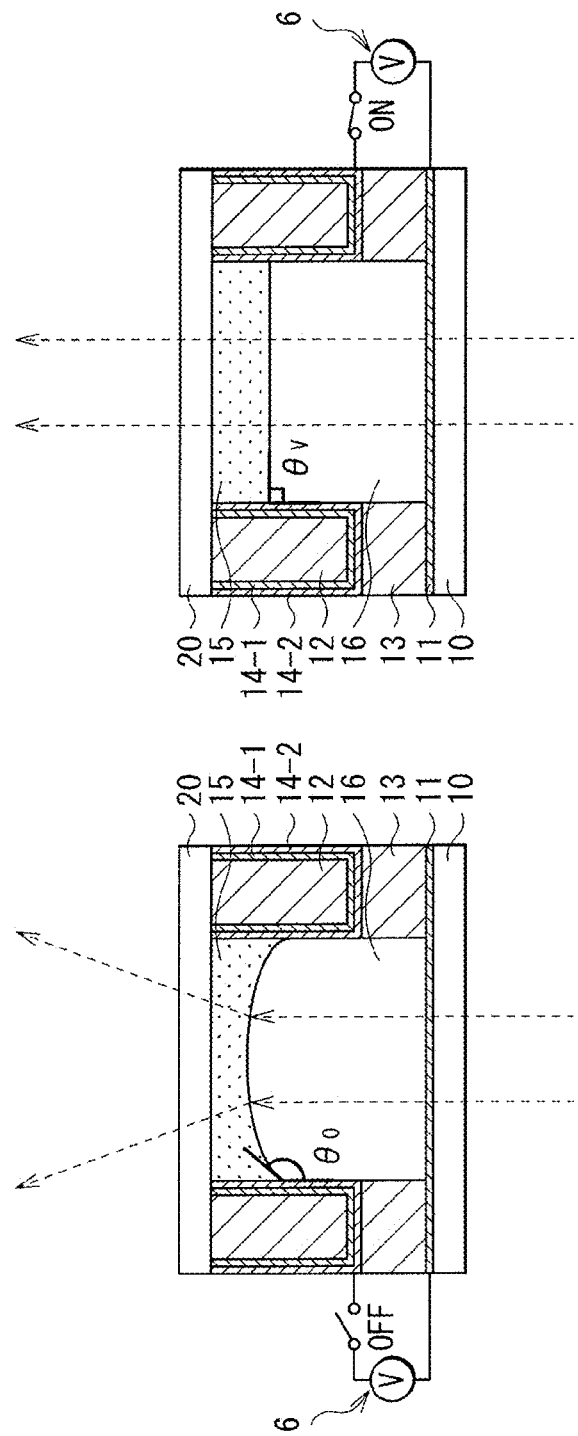
FIGS. 3A and 3B are cross sectional views illustrating an operation principle of an electro-wetting type liquid lens.

The liquid lenticular lens 3 is an electro-wetting type liquid lens array in which lens effect is on-off controlled according to an applied voltage. A description will be given of a basic structure and an operation principle of the liquid lenticular lens 3 with reference to FIGS. 3A and 3B. In this case, for explaining the basic principle, FIGS. 3A and 3B illustrate a structure of one variable lens (liquid lens). For the sections corresponding to those of the structures illustrated in FIGS. 2A and 2B, the same referential symbols are affixed thereto. FIG. 3A illustrates a state that lens effect of a liquid lens simple body is on (state that given negative refractive power is generated), and FIG. 3B illustrates a state that lens effect of a liquid lens simple body is off (state that refractive power is not generated).

In the electro-wetting type variable lens, lens effect is controlled by changing interface shape of two types of liquids with each refractive index different from each other with the use of a fact that wetting characteristics between liquid and solid surface is changed according to an applied voltage. In the structure of the variable lens illustrated in FIGS. 3A and 3B, the hydrophilic conducting film 11 is formed on the surface of the first substrate 10, and the conducting film 14-1 and the insulating water-shedding film 14-2 are formed on the surface of the dividing wall 12. The insulating water-shedding film 14-2 is made of, for example, a parylene film. The silicon oil 15 is injected to the second substrate 20 and the insulating water-shedding film 14-2 side, the electrolytic solution 16 is injected to the hydrophilic conducting film 11 side in the gap between the first substrate 10 and the second substrate 20, and the gap is sealed. The hydrophilic conducting film 11 and the conducting film 14-1 are electrically connected to an electric power source 6, and a voltage is applied thereto. FIG. 3B illustrates a state that a voltage is applied by the electric power source 6 (electrically on-state), and FIG. 3A illustrates a state that a voltage is not applied (electrically off-state).

The electrolytic solution 16 has characteristics that wetting characteristics in relation to the surface of the dividing wall 12 (insulating water-shedding film 14-2) are improved in proportion as square of an applied voltage. Thus, where the contact angle with the surface of the dividing wall 12 when the applied voltage is 0 is $\theta_0$ and the contact angle with the surface of the dividing wall 12 when the applied voltage is not 0 is $\theta_v$, relation of $\theta_0 > \theta_v$ is established. Further, a given applied voltage $V_{90}$ at which lens effect is zero ($\theta_v = 90$ deg, the interface shape between the silicone oil 15 and the electrolytic solution 16 is flat) is able to be found. Accordingly, by switching the applied voltage between 0 and the given applied voltage $V_{90}$, lens effect is able to be provided with on/off switch control. Where refractive index n1 of the silicone oil 15 is higher than refractive index n2 of the electrolytic solution 16, negative refractive power lens effect is generated where the applied voltage is 0 as illustrated in FIG. 3A.

In other words, in the variable lens composed of the liquid lenticular lens 3, lens effect becomes in on-state (FIG. 3A) when it becomes in off-state electrically by setting the applied voltage to zero. Further, lens effect becomes off-state (FIG. 3B) when it becomes in on-state electrically by setting the applied voltage to the given voltage $V_{90}$. Such a relation between electrically on/off state and on/off state of lens effect is specific to the electro-wetting type liquid lens. For example, by setting specific gravity of the silicone oil 15 to a value equal to that of the electrolytic solution 16, gravity effect on two types of liquids is able to be equalized. Thus, in this case, it is regarded that the interface shape is determined by only wetting characteristics based on the applied voltage and gravity influence does not exist.

Lens Action as the Whole Variable Lens Array Device 1

In the variable lens array device 1, in a state that a voltage is not applied to the liquid lenticular lens 3 by the electric power source 6 (electrically off-state) as illustrated in FIG. 2A, lens effect of the plurality of variable lenses in the liquid lenticular lens 3 becomes in on-state. The lens effect of the respective variable lenses in the liquid lenticular lens 3 is set off by the corresponding fixed lens (cylindrical lens 4A) in the fixed lenticular lens 4. In other words, whole lens effect of a combination of the liquid lenticular lens 3 and the fixed lenticular lens 4 becomes in off-state.

Meanwhile, in a state that a given voltage is applied to the liquid lenticular lens 3 by the electric power source 6 (electrically on-state) as illustrated in FIG. 2B, lens effect of the plurality of variable lenses in the liquid lenticular lens 3 becomes in off-state. In this state, a voltage value is adjusted so that the interface shape between the silicone oil 15 and the electrolytic solution 16 composing the liquid layer in the liquid lenticular lens 3 becomes flat in the respective variable lens sections. In this state, lens effect of the liquid lenticular lens 3 is ineffective independently, and only lens effect by the fixed lenticular lens 4 is effective. In other words, whole lens effect of a combination of the liquid lenticular lens 3 and the fixed lenticular lens 4 becomes in on-state.

As described above, the variable lens array device 1 includes the fixed lenticular lens 4 having refractive power to set off lens effect of the liquid lenticular lens 3. Thus, electric on/off characteristics of lens effect of the liquid lenticular lens 3 are able to be reversed. In the variable lens array device 1, whole lens effect of a combination of the liquid lenticular lens 3 and the fixed lenticular lens 4 becomes in off-state (state without refractive power) when lens effect of the liquid lenticular lens 3 becomes in on-state (state that given negative refractive power is generated). In addition, when lens effect of the liquid lenticular lens 3 becomes in off-state, whole lens effect becomes in on-state. In other words, electric on/off characteristics of lens effect of the whole variable lens array device 1 become in a state that is reversed in relation to characteristics of the liquid lenticular lens 3 as a simple body.

Operation and Effect of the Stereoscopic Display Unit

In the stereoscopic display unit, display is switched between display in two-dimensional display mode, display in three-dimensional display mode by eyeglass method (second three-dimensional display mode), and display in three-dimensional display mode by naked eye method (first three-dimensional display mode).

(1) Two-Dimensional Display Mode

In a state of performing two-dimensional image display (two-dimensional matrix display) on the display panel 2, lens effect by the variable lens array device 1 is set to in off-state. By transmitting displayed image light from the display panel 2 without refracting the light by the variable lens array device 1, two-dimensional display is directly performed. The light from the displayed image of the display panel 2 is converted to light in the first polarization state (circular polarized light counterclockwise) and light in the second polarization state (circular polarized light clockwise) for every pixel region corresponding to the region provided with the first phase difference plate 5A and the second phase difference plate 5B in the polarization state conversion section 5. However, the foregoing polarization difference is not recognized with naked eyes, and thus observing two-dimensional display is not affected.

(2) Three-Dimensional Display Mode by Eyeglass Method (FIG. 4)

Display is performed so that the left-eye image L and the right-eye image R are alternately arranged along the vertical direction on the display panel 2. Lens effect by the variable lens array device 1 is set to in off-state. In the polarization state conversion section 5, light is output so that light originated in the left-eye image L is converted to light in the first polarization state (circular polarized light counterclockwise), and light originated in the right-eye image R is converted to light in the second polarization state (circular polarized light clockwise). In the variable lens array device 1, converted first light ray originated in the left-eye image L and converted second light ray originated in the right-eye image R are transmitted without being refracted. The transmitted left-eye image L and the transmitted right-eye image R are observed through the polarized eyeglasses 40, and therefore three-dimensional display by eyeglass method is performed. More specifically, in the first phase difference plate 5A of the polarization state conversion section 5, only light in the first polarization state is transmitted through the first polarization filter 41L of the polarized eyeglasses 40, and therefore only the left-eye image L is sensed by the left-eye 9L of the observer. Further, in the second phase difference plate 5B of the polarization state conversion section 5, only light in the second polarization state is transmitted through the second polarization filter 41R of the polarized eyeglasses 40, and therefore only the right-eye image R is sensed by the right-eye 9R of the observer. Therefore, binocular parallax stereoscopic vision is enabled.

(3) Three-Dimensional Display Mode by Naked Eye Method (FIG. 5)

Display is performed so that the left-eye image L and the right-eye image R are alternately arranged along the horizontal direction on the display panel 2. Lens effect by the variable lens array device 1 is set to in on-state. In the variable lens array device 1, light ray originated in the left-eye image L and light ray originated in the right-eye image R displayed on the display panel 2 are refracted and optically separated so that stereoscopic vision by naked eyes is enabled. In other words, in the variable lens array device 1, optical light ray separation is performed by refraction so that the left-eye image L and the right-eye image R selectively enter the left-eye 9L and the right-eye 9R of the observer 9 respectively and appropriately. Therefore, binocular parallax stereoscopic vision is enabled. In the three-dimensional display mode by naked eye method, the light from the display image of the display panel 2 is converted to light in the first polarization state and light in the second polarization state for every pixel region corresponding to the region provided with the first phase difference plate 5A and the second phase difference plate 5B in the polarization state conversion section 5. However, the polarization difference is not recognized with naked eyes, and thus observing three-dimensional display by naked eye method is not affected. Further, if the polarized eyeglasses 40 are used, observation of the three-dimensional display is not affected. In this case, right and left parallax separation is already completed by the variable lens array device 1. Thus, only the left-eye image L selectively enters the left-eye 9L of the observer 9, and the right-eye image R selectively enters the right-eye 9R of the observer 9 through the polarized eyeglasses 40, and therefore a stereoscopic image is sensed.

As described above, in the three-dimensional display mode by naked eye method, the difference of the polarization states between the left-eye image L and the right-eye image R is not observed by naked eyes, and therefore the polarization state conversion section 5 is not limited to the structure illustrated in FIG. 5. For example, in FIG. 5, a left-eye polarization segment and a right-eye polarization segment may be alternately arranged along a horizontal direction (not illustrated) instead of a vertical direction.

As described above, according to this embodiment, the polarization state conversion section 5, the variable lens array device 1, and the polarized eyeglasses 40 are appropriately combined, and the lens effect of the variable lens array device 1 is on-off controlled according to the content of the image displayed on the display panel 2. Thus, display is switchable between two-dimensional display and three-dimensional display, and three-dimensional display method is switchable between naked eye method and eyeglass method. Therefore, three-dimensional display suitable for audiovisual environment is enabled. For example, when the number of viewers is one or a small number such as two or more, three-dimensional display by naked eye method is able to be adopted. In this case, dedicated eyeglasses for three-dimensional display are not necessitated. Further, by performing three-dimensional display by eyeglass method, display images are able to be viewed by many persons, and a viewer is able to view display images by freely selecting the viewing position.

Second Embodiment

Next, a description will be given of a stereoscopic display unit according to a second embodiment of the invention. For the substantively same elements as those of the stereoscopic display unit according to the foregoing first embodiment, the same referential symbols are affixed thereto, and the description thereof will be omitted as appropriate.

Figure 6:
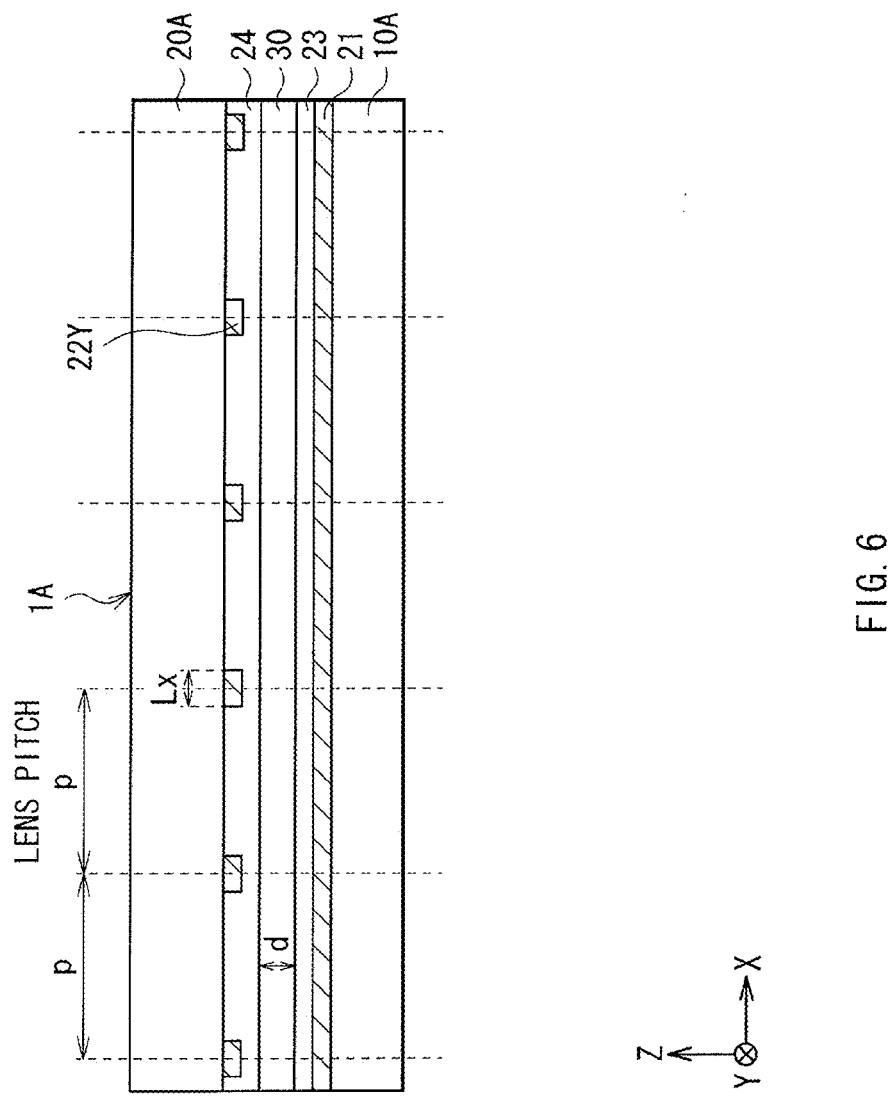
FIG. 6 is cross sectional view illustrating a structure of a variable lens array device in a stereoscopic display unit according to a second embodiment of the invention.

FIG. 6 illustrates a structure of a variable lens array device 1A in the stereoscopic display unit according to the second embodiment. The stereoscopic display unit according to this embodiment includes the variable lens array device 1A by liquid crystal lens method instead of the variable lens array device 1 using the liquid lens in FIG. 1. The structure of this embodiment is the same as that of the foregoing first embodiment, except that the structure of the variable lens array device 1A is different.

Whole Structure of the Variable Lens Array Device 1A

The variable lens array device 1A is a variable lens array by liquid crystal lens method, and is able to electrically on/off control lens effect. The variable lens array device 1A is intended to selectively change passing state of light ray from the display panel 2 by controlling lens effect according to the display mode.

As illustrated in FIG. 6, the variable lens array device 1A includes a first substrate 10A and a second substrate 20A that are oppositely arranged with a gap d in between and a liquid crystal layer 30 arranged between the first substrate 10A and the second substrate 20A. The first substrate 10A and the second substrate 20A are a transparent substrate made of, for example, a glass material or a resin material. On the side opposed to the second substrate 20A on the first substrate 10A, a first electrode 21 made of a transparent conductive film such as an ITO film is uniformly formed over almost all area. Further, a first alignment film 23 is formed over the first substrate 10A with the first electrode 21 in between and is contacted with the liquid crystal layer 30. On the side opposed to the first substrate 10A on the second substrate 20A, a second electrode 22Y made of a transparent conductive film such as an ITO film is partially formed. Further, a second alignment film 24 is formed over the second substrate 20A with the second electrode 22Y in between and is contacted with the liquid crystal layer 30.

Figure 8A:
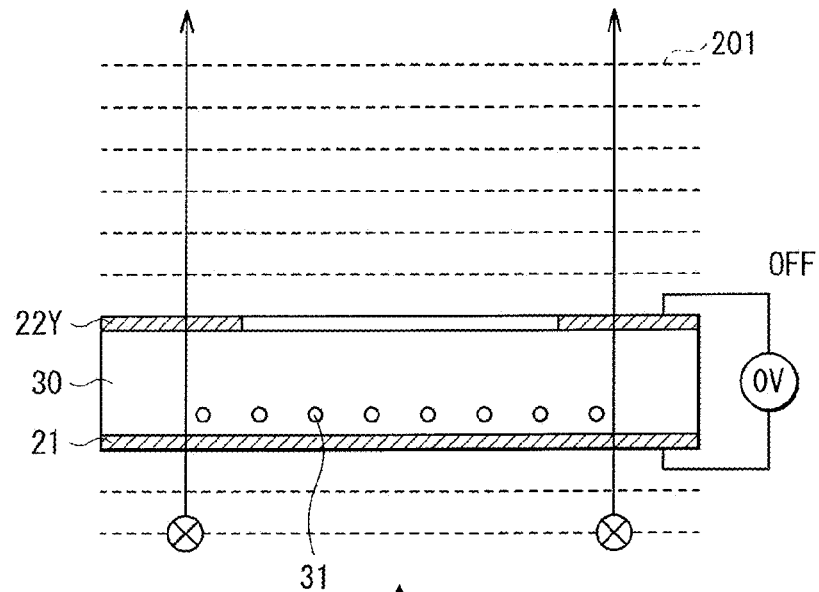
FIGS. 8A and 8B are views for explaining on/off state of lens effect in the variable lens array device illustrated in FIG. 6.
Figure 8B:
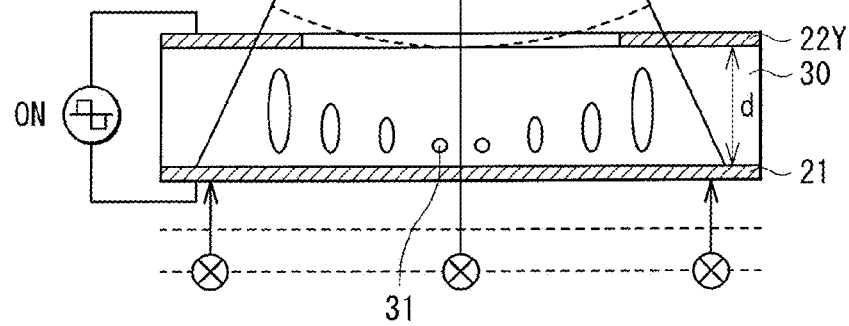

FIGS. 8A and 8B illustrate the basic principle of lens effect generation in the variable lens array device 1A. In FIGS. 8A and 8B, for explaining the basic principle, the structure of the variable lens array device 1A is illustrated simplistically. The liquid crystal layer 30 includes liquid crystal molecules 31. Lens effect is controlled by changing alignment direction of the liquid crystal molecules 31 according to a voltage applied to the first electrode 21 and the second electrode 22Y. The liquid crystal molecule 31 has refractive index anisotropy, and has a structure of, for example, a refractive index ellipsoidal body in which refractive index in relation to transmitted light ray in the longitudinal direction is different from that in the short direction. The state of the liquid crystal layer 30 is electrically switched between a state without lens effect and a state with generation of lens effect according to the state of a voltage applied to the first electrode 21 and the second electrode 22Y.

In the variable lens array device 1A, as illustrated in FIG. 8A, in a normal state that an applied voltage is 0 V, the liquid crystal molecules 31 are uniformly aligned in a given direction determined by the first alignment film 23 and the second alignment film 24. Thus, a wave surface 201 of transmitted light ray becomes plane wave, and lens effect does not exist. Meanwhile, in the variable lens array device 1A, the plurality of second electrodes 22Y are estranged at given intervals. Thus, when a given drive voltage is applied between the first electrode 21 and the second electrode 22Y, bias is generated in electric field distribution inside the liquid crystal layer 30. In other words, electric field having the following characteristics is generated. In the section corresponding to the region where the second electrode 22Y is formed, the electric field intensity is increased according to the drive voltage, while as location is close to the central section of each aperture between the plurality of second electrodes 22Y, the electric field intensity is decreased. Thus, as illustrated in FIG. 8B, alignment of the liquid crystal molecules 31 is changed according to the electric field intensity distribution. Therefore, a wave surface 202 of transmitted light ray is changed, and lens effect is generated.

Electrode Structure of the Variable Lens Array Device 1A

Figure 7A:
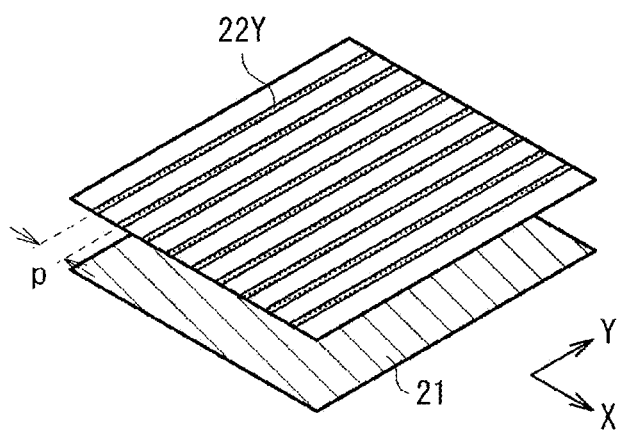
FIG. 7A is a perspective view illustrating a structural example in an electrode section of the variable lens array device illustrated in FIG. 6.
Figure 7B:
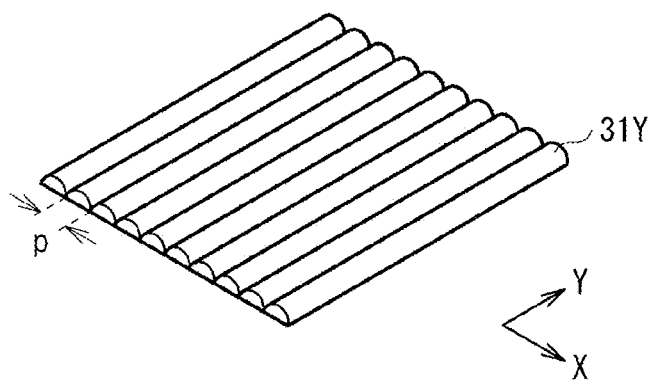
FIG. 7B is a perspective view illustrating a lens shape formed by the variable lens array device illustrated in FIG. 6 in an optically equivalent manner.

FIG. 7A illustrates a planar structure example of the electrode section of the variable lens array device 1A. FIG. 7B illustrates a lens shape formed in the case of the electrode structure illustrated in FIG. 7A in an optically equivalent manner. The second electrode 22Y has an electrode width Lx, and is extended in the vertical direction. As illustrated in FIG. 7A, the plurality of second electrodes 22Y are arranged in parallel with each other at intervals corresponding to lens pitch p in generating lens effect. In the case where lens effect is generated, a given electric potential difference at which alignment of the liquid crystal molecules 31 is able to be changed between the upper and lower electrodes sandwiching the liquid crystal layer 30 is given. The first electrode 21 is formed over the whole area of the first substrate 10A, and the second electrodes 22Y are partially arranged at certain intervals in the lateral direction. Thus, when a given drive voltage is applied to the second electrodes 22Y, bias is generated in electric field distribution inside the liquid crystal layer 30 based on the principle illustrated in FIG. 8B. In other words, electric field having the following characteristics is generated. In the section corresponding to the region where the second electrode 22Y is formed, the electric field intensity is increased according to the drive voltage, while as location departs from the second electrode 22Y in the lateral direction, the electric field intensity is decreased. In other words, electric field distribution is changed so that lens effect is generated in the lateral direction (X-axis direction). In other words, as illustrated in FIG. 7B, a plurality of cylindrical lenses 31Y that are extended in the Y-axis direction and have refractive power in the X-axis direction are arranged in parallel with each other in the X-axis direction in an equivalent manner.

Switching operation between two-dimensional display and three-dimensional display and switching operation between naked eye method and eyeglass method of three-dimensional display are basically similar to those of the foregoing first embodiment.

Modified Example

Figure 9:
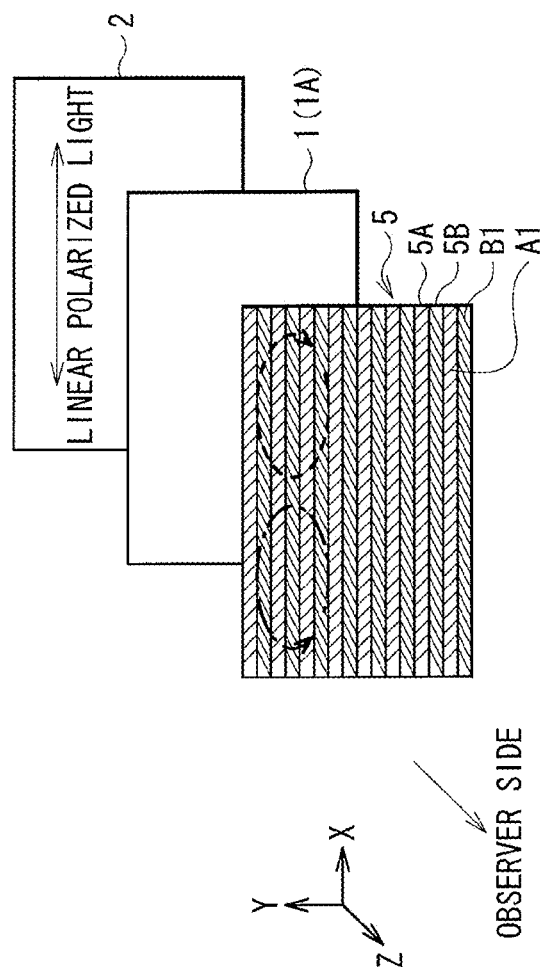
FIG. 9 is a structural view illustrating a first modified example of the stereoscopic display unit illustrated in FIG. 1.

The invention is not limited to the foregoing respective embodiments, but various modifications may be made. For example, in the foregoing respective embodiments, the variable lens array device 1 or 1A is arranged on the light exit side of the polarization state conversion section 5. However, as illustrated in FIG. 9, the variable lens array device 1 or 1A may be arranged between the display panel 2 and the polarization state conversion section 5.

Figure 10:
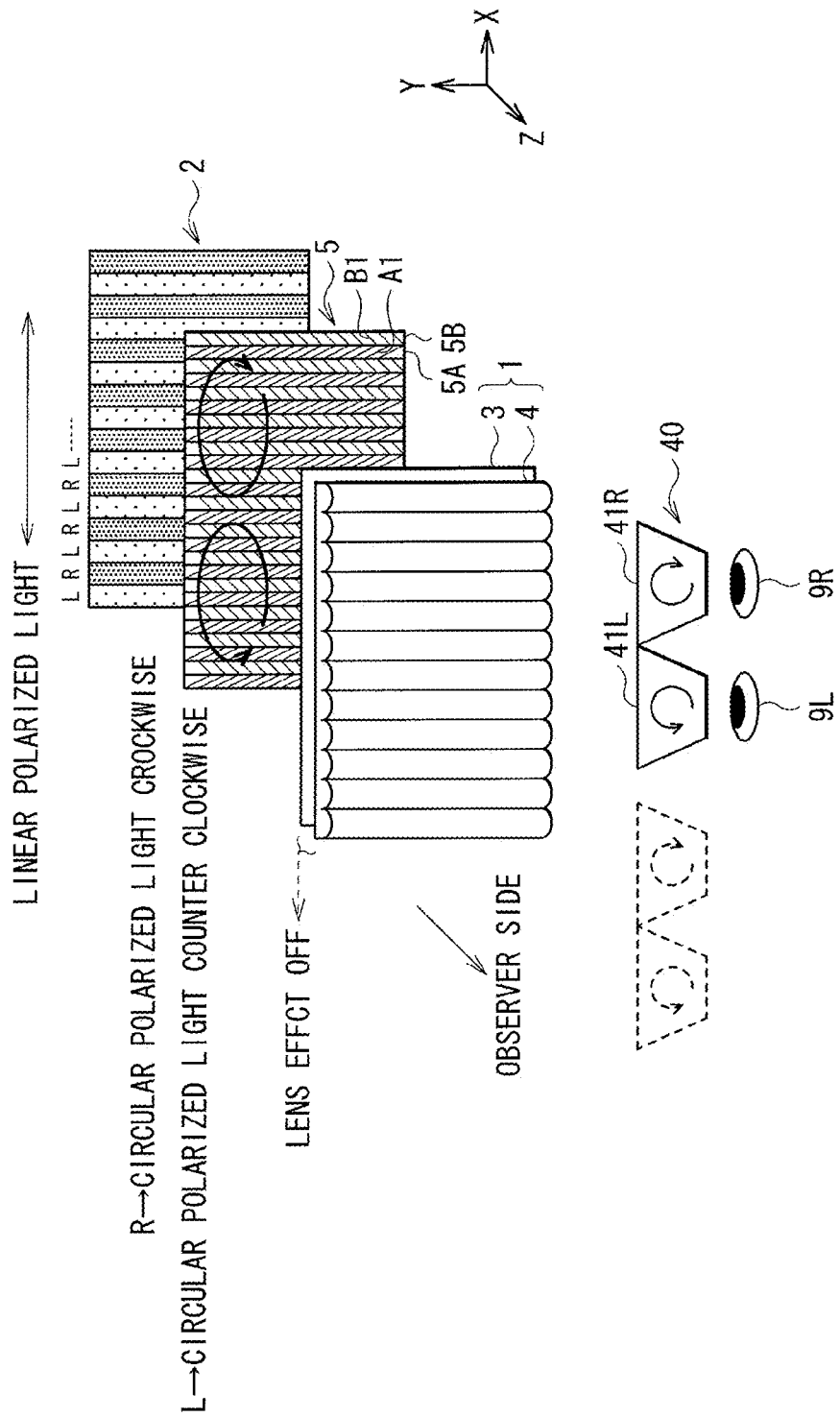
FIG. 10 is a structural view illustrating a second modified example of the stereoscopic display unit illustrated in FIG. 1.

Further, in the foregoing respective embodiments, in performing three-dimensional display by eyeglass method, display is performed so that the left-eye image L and the right-eye image R are alternately arranged along the vertical direction on the display panel 2. However, display may be performed in the same manner as that in the three-dimensional display by naked eye method. In other words, display may be performed so that the left-eye image L and the right-eye image R are alternately arranged along the horizontal direction on the display panel 2. In this case, as illustrated in FIG. 10, the first phase difference plate 5A and the second phase difference plate 5B in the polarization state conversion section 5 are alternately arranged in the horizontal direction correspondingly to the display regions of the left-eye image L and the right-eye image R. In this case, the light originated in the image displayed on the display panel 2 is alternately converted to light in the first polarization state and light in the second polarization state in the horizontal direction for every region corresponding to the left-eye image L and the right-eye image R. After that, as in the display example of FIG. 4, by observing through the polarized eyeglasses 40, only the left-eye image L is sensed by the left-eye 9L of the observer, only the right-eye image R is sensed by the right-eye 9R of the observer, and therefore binocular parallax stereoscopic vision is enabled.

Figure 11:
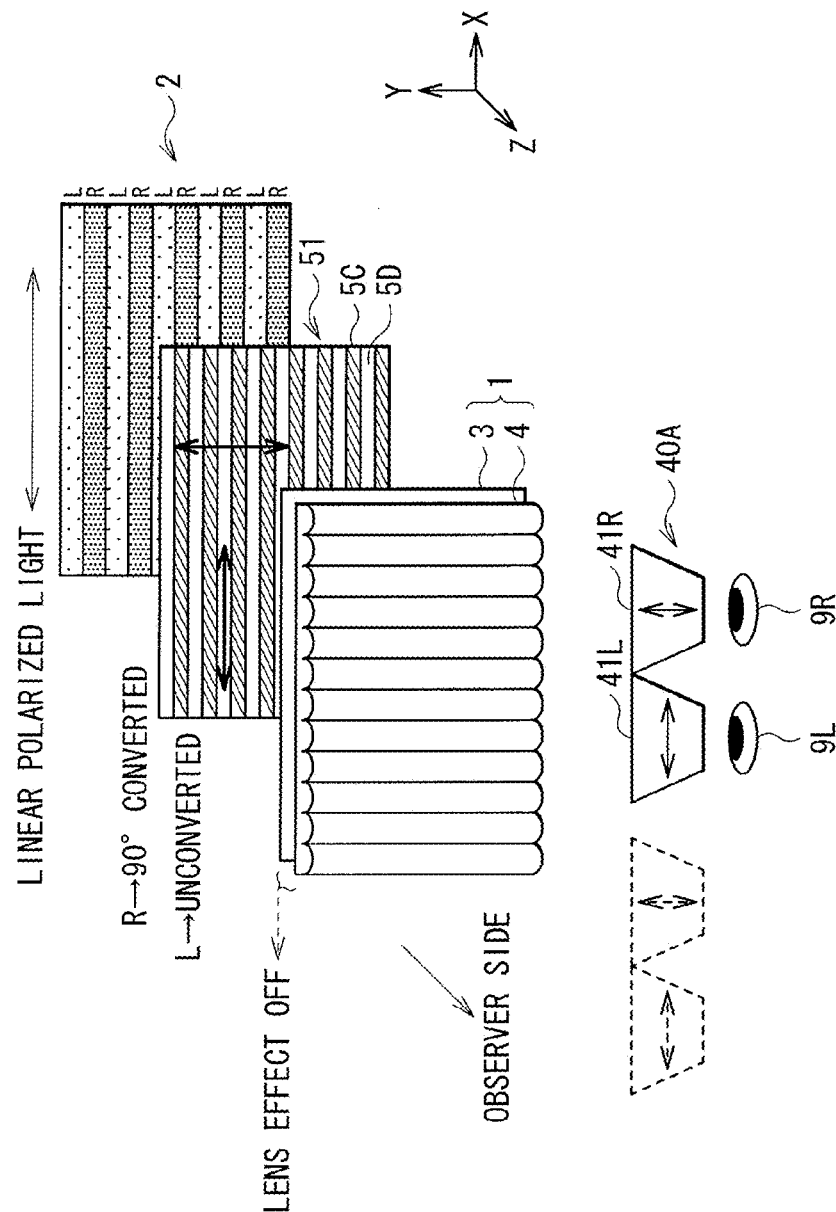
FIG. 11 is a structural view illustrating a third modified example of the stereoscopic display unit illustrated in FIG. 1.

Further, in the foregoing respective embodiments, in performing three-dimensional display by eyeglass method, the linear polarized light output from the display panel 2 is converted to respective circular polarized light with its rotation direction different from each other by the polarization state conversion section 5. However, the respective light may be converted in a different manner. For example, the respective light may be converted to respective linear polarized light with its polarization direction different from each other. FIG. 11 illustrates an example of such a modified example. In the modified example of FIG. 11, compared to the structure of FIG. 4, a polarization state conversion section 51 is included instead of the polarization state conversion section 5, and polarized eyeglasses 40A are included instead of the polarized eyeglasses 40.

The polarization state conversion section 51 has a transmission section 5D and a phase difference plate 5C. The transmission section 5D and the phase difference plate 5C are in the shape of a strip being extended in the horizontal direction. A plurality of transmission sections 5D and a plurality of phase difference plates 5C are alternately arranged in the vertical direction. The transmission section 5D is provided in a position corresponding to a display region of the left-eye image L displayed when three-dimensional display by eyeglass method is performed in the display panel 2. The phase difference plate 5C is provided in a position corresponding to a display region of the right-eye image R displayed when three-dimensional display by eyeglass method is performed in the display panel 2. Alternatively, the transmission section 5D may be provided in the position corresponding to the display region of the right-eye image R, and the phase difference plate 5C may be provided in the position corresponding to the display region of the left-eye image L. In this case, where light originated in the image displayed on the display panel 2 is linear polarized light that is polarized in the first polarization direction (X-axis direction), the transmission section 5D outputs the linear polarized light in the first polarization direction output from the display panel 2 as light in the first polarization state without changing the polarization direction. The phase difference plate 5C is made of a ½ wave plate. The phase difference plate 5C converts the linear polarized light in the first polarization direction output from the display panel 2 to a linear polarized light in the second polarization direction (Y-axis direction) 90 deg different from the first polarization direction, and outputs the converted light in the second polarization state. Therefore, the left-eye image L is converted to linear polarized light in the first polarization direction by the transmission section 5D, and the right-eye image R is converted to linear polarized light in the second polarization direction by the phase difference plate 5C. To match therewith, the first polarization filter 41L for the left-eye 9L in the polarized eyeglasses 40A is set to a filter that transmits only linear polarized light in the first polarization direction, and the second polarization filter 41R for the right-eye 9R in the polarized eyeglasses 40A is set to a filter that transmits only linear polarized light in the second polarization direction. Therefore, only the left-eye image L selectively enters the left-eye 9L of the observer 9, and the right-eye image R selectively enters the right-eye 9R of the observer 9 through the polarized eyeglasses 40A, and therefore a stereoscopic image is sensed.

The present application contains subject matter related to that disclosed in Japanese Priority Patent Application JP 2009-264985 filed in the Japan Patent Office on Nov. 20, 2009, the entire contents of which is hereby incorporated by reference.

It should be understood by those skilled in the art that various modifications, combinations, sub-combinations and alternations may occur depending on design requirements and other factors insofar as they are within the scope of the appended claims or the equivalents thereof.

What is claimed is:
1. A stereoscopic display device, comprising:
  a display panel operable to transmit light corresponding to image data;
  a polarization state conversion section comprising a first polarization segment for converting light transmitted by the display device to a first polarization state, and a second polarization segment for converting light transmitted by the display device to a second polarization state;

an optical separation element that is placed, via application of a voltage, in an on state in which light transmitted by the display panel is refracted or an off state in which light transmitted by the display panel is not refracted;

wherein the stereoscopic display device is operable to display either two-dimensional or three-dimensional images, and is switchable from a two-dimensional display mode to a first three-dimensional display mode enabling non-autostereoscopic image display, from the first three-dimensional display mode to a second three-dimensional display mode enabling autostereoscopic image display, and from the second three-dimensional display mode to the first three-dimensional display mode;

wherein:
the optical separation element comprises a variable lens array;
the variable lens array comprises a liquid lenticular lens;
the liquid lenticular lens comprises an electro-wetting type liquid lens array placed in an on state or an off state via application of a voltage; and
the liquid lenticular lens is placed in an on state by applying zero voltage, and placed in an off state by applying a non-zero voltage.

2. The stereoscopic display device of claim 1, wherein the variable lens array further comprises fixed lenticular lens.

3. The stereoscopic display device of claim 2, wherein the fixed lenticular lens extends in a longitudinal direction in relation to the display panel.

4. The stereoscopic display device of claim 2, wherein the fixed lenticular lens refracts light in a manner opposite to a manner in which the liquid lenticular lens refracts light, when the variable lens array is in an on state.

5. The stereoscopic display device of claim 2, wherein each of the plurality of fixed lenticular lenses has a pitch corresponding to a pixel width on the display panel.

6. The stereoscopic display device of claim 1, wherein when the liquid lenticular lens is placed in an on state, an extent to which light is refracted by the liquid lenticular lens is offset by an extent to which the light is refracted by the fixed lenticular lens.

7. The stereoscopic display device of claim 1, wherein when the liquid lenticular lens is placed in an off state, an extent to which light is refracted by the liquid lenticular lens is not offset by an extent to which the light is refracted by the fixed lenticular lens.

8. The stereoscopic display device of claim 1, wherein the liquid lenticular lens comprises a first liquid having an interface with a second liquid, and wherein a shape of the interface is changed according to an applied voltage.

9. The stereoscopic display device of claim 8, wherein upon a voltage being applied, the shape of the interface between the first liquid and the second liquid becomes flat.

10. The stereoscopic display device of claim 8, wherein upon no voltage being applied, the shape of the interface between the first liquid and the second liquid becomes non-flat.

11. The stereoscopic display device of claim 9, wherein a refractive index of the first liquid is higher than a refractive index of the second liquid, and a negative refractive power is created when no voltage is applied.

12. The stereoscopic display device of claim 2, wherein each one of the plurality of liquid lenticular lenses comprises a liquid layer disposed between two dividing walls, each dividing wall having a pitch defined by a pitch of the fixed lenticular lens corresponding to the one liquid lenticular lens.

13. The stereoscopic display device of claim 12, wherein the liquid layer has wetting characteristics such that when no voltage is applied, a contact angle between the liquid layer and a surface of a dividing wall is $\theta_0$, and when a voltage is applied a contact angle between the liquid layer and the dividing wall is $\theta_v$, and wherein $\theta_0 > \theta_v$.

14. The stereoscopic display device of claim 1, wherein the optical separation element comprises a parallax barrier.

15. The stereoscopic display device of claim 1, wherein to display images in the two-dimensional display mode, the display panel transmits light corresponding to two-dimensional image data and the optical separation element is placed in the off state.

16. The stereoscopic display device of claim 1, wherein to display images in the first three-dimensional display mode, the display panel transmits light corresponding to three-dimensional image data, the optical separation element is placed in the off state, the first polarization segment converts light transmitted by the display panel corresponding to a left-eye image to a first polarization state, and the second polarization segment converts light transmitted by the display panel corresponding to a right-eye image to a second polarization state.

17. The stereoscopic display device of claim 1, wherein to display images in the first three-dimensional display mode:
the display panel transmits light, corresponding to three-dimensional image data comprising a left-eye image and a right-eye image between which parallax exists, so that light corresponding to the left-eye image and light corresponding to the right-eye image are transmitted from display panel regions alternately arranged in a vertical direction;
the polarization state conversion section converts the light corresponding to the left-eye image to circular polarized light in a first rotation direction, and the light corresponding to the right-eye image to circular polarized light in a second rotation direction; and
the optical separation element transmits, without refracting, the light corresponding to the left-eye image and the light corresponding to the right-eye image.

18. The stereoscopic display device of claim 17, wherein the first rotation direction is counterclockwise and the second rotation direction is clockwise.

19. The stereoscopic display device of claim 17, wherein the polarization state conversion section comprises phase difference plates alternately arranged in a vertical direction corresponding to display panel regions from which light corresponding to left-eye image and light corresponding to right-eye image are transmitted.

20. The stereoscopic display device of claim 1, wherein to display images in the first three-dimensional display mode:
the display panel transmits light, corresponding to three-dimensional image data comprising a left-eye image and a right-eye image between which parallax exists, so that light corresponding to the left-eye image and light corresponding to the right-eye image are transmitted from display panel regions alternately arranged in a horizontal direction;
the polarization state conversion section converts the light corresponding to the left-eye image to circular polarized light in a first rotation direction, and the light corresponding to the right-eye image to circular polarized light in a second rotation direction; and the optical separation element transmits, without refracting, the light corresponding to the left-eye image and the light corresponding to the right-eye image.

21. The stereoscopic display device of claim 1, wherein to display images in the second three-dimensional display mode, the display panel transmits light corresponding to three-dimensional image data, the optical separation element is placed in the on state to refract and separate light transmitted by the display panel corresponding to a left-eye image and light transmitted by the display panel corresponding to a right-eye image.

22. The stereoscopic display device of claim 21, wherein the light transmitted by the display panel corresponding to the left-eye image and the light transmitted by the display panel corresponding to the right-eye image are arranged into a plurality of alternating image regions each extending in a horizontal direction.

23. The stereoscopic display device of claim 21, wherein the light transmitted by the display panel corresponding to the left-eye image and the light transmitted by the display panel corresponding to the right-eye image are arranged into a plurality of alternating image regions each extending in a vertical direction.

24. The stereoscopic display device of claim 1, wherein to display images in the second three-dimensional display mode:
   the display panel transmits light, corresponding to three-dimensional image data comprising a left-eye image and a right-eye image between which parallax exists, so that light corresponding to the left-eye image and light corresponding to the right-eye image are transmitted from display panel regions alternately arranged in a horizontal direction;
   the polarization state conversion section converts the light corresponding to the left-eye image to circular polarized light in a first rotation direction, and the light corresponding to the right-eye image to circular polarized light in a second rotation direction; and
   the optical separation element refracts and optically separates the light corresponding to the left-eye and the right-eye images so that the light corresponding to the left-eye image enters the left eye of the viewer and the light corresponding to the right-eye image enters the right eye of the viewer.

25. The stereoscopic display device of claim 24, wherein the polarization state conversion section comprises phase difference plates alternately arranged in a vertical direction corresponding to display panel regions from which light corresponding to left-eye image and light corresponding to right-eye image are transmitted.

26. The stereoscopic display device of claim 24, wherein the polarization state conversion section comprises phase difference plates alternately arranged in a horizontal direction.

27. The stereoscopic display device of claim 1, wherein the display panel comprises a transmissive liquid crystal display.

28. The stereoscopic display device of claim 1, wherein the display panel comprises an organic EL (Electro-Luminescence) display panel or a plasma display panel.

29. The stereoscopic display device of claim 1, wherein the optical separation element comprises a liquid crystal lens having liquid crystal molecules.

30. The stereoscopic display device of claim 29, wherein application of a voltage places the optical separation element in the on state by changing an alignment direction of the liquid crystal molecules.

31. The stereoscopic display device of claim 29, wherein when no voltage is applied, the liquid crystal molecules are uniformly aligned and a light ray transmitted via the liquid crystal lens is a plane wave, and wherein when a voltage is applied alignment direction of the liquid crystal molecules is modified and a wave surface of a light ray transmitted via the liquid crystal lens is changed to a non-plane wave.

32. The stereoscopic display device of claim 31, wherein:
   the optical separation element comprises first and second substrates, a first electrode and a plurality of and second electrodes, the first electrode and the plurality of second electrodes being disposed between the first substrate and the second substrate, the first electrode being disposed between the first substrate and the liquid crystal lens, the plurality of second electrodes being disposed between the liquid crystal lens and the second substrate, the plurality of second electrodes being arranged in regions at intervals; and
   when a voltage is applied between the first electrode and the plurality of second electrodes, a bias is generated in electric field distribution inside the liquid crystal lens, so that electric field intensity is greater near regions where the plurality of second electrodes are disposed than near regions where the plurality of second electrodes are not disposed, the bias modifying an alignment direction of the liquid crystal molecules and changing a wave surface of a light ray transmitted via the liquid crystal lens to a non-plane wave.

* * * * *